June 3, 1941.  J. F. BROWN  2,244,138

THREAD CONDITIONING TOOL

Filed Oct. 2, 1939

INVENTOR
J. F. BROWN.
By J. Vincent Martin
and
Ralph R. Browning
ATTORNEYS

Patented June 3, 1941

2,244,138

UNITED STATES PATENT OFFICE 2,244,138

THREAD CONDITIONING TOOL

Jesse F. Brown, Houston, Tex., assignor to Reed Roller Bit Company, Houston, Tex., a corporation of Texas Application October 2, 1939, Serial No. 297,480

12 Claims. (Cl. 10—1)

The present invention relates to a tool for restoring threads and more particularly to a die or device for cleaning or repairing damaged threads on bit heads, pins, pipes and the like.

One object is to provide a tool for cleaning and repairing tapered threads.

One of the objects of the invention is to provide a form of tool or die for cleaning and repairing damaged threads on bit heads and the like with rapidity and high accuracy.

Another object of the invention is to provide a form of tool for restoring damaged threads upon the shank of bit heads and similar uses which is of a construction to permit extremely rough usage without danger of damage to the tool.

Another object of the invention is to provide a form of tool for restoring threads on bit heads and the like in which the chaser or cutter may adjust itself while it is in position to constantly exert a pressure against the different portions of a tapered thread to be restored so as to cut or operate only upon damaged portions of the threads without producing a cut upon the undamaged portions thereof.

Another object of the invention is to provide a form of tool for restoring threads in which the component parts may be rapidly assembled and which is relatively simple in construction so as to permit operation and use in relatively unskilled hands.

Another object of the invention is to provide a form of tool for restoring threads which may be readily disassembled and in which the unassembled parts take up a minimum space for shipment or storage.

With these and other objects in view, the invention comprises the various features hereinafter more fully described and defined in the claims annexed hereto.

The various features of the invention are illustrated in the accompanying drawing, in which—

Figure 1:
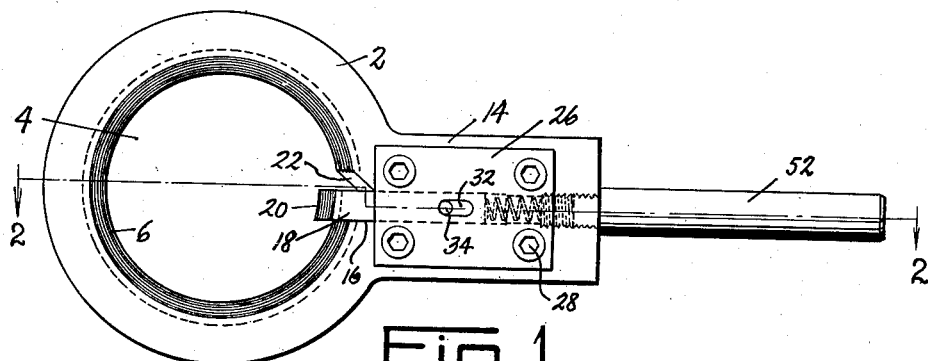
Figure 1 is a plan view of the thread restoring tool of the invention in assembled form.
Figure 2:
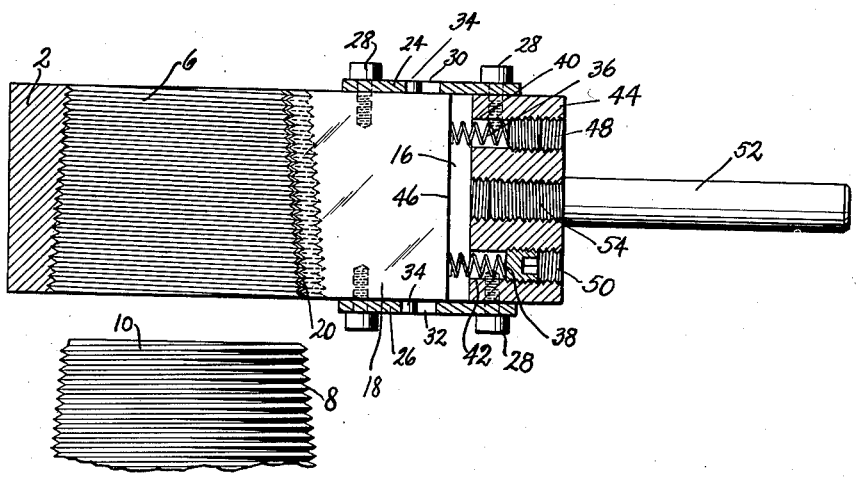
Figure 2 is a sectional view taken on the section line 2—2 of Figure 1 and showing a section of the shank of a bit head on which the tool may be operated.
Figure 3:
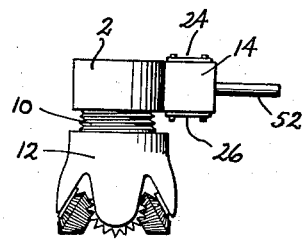
Figure 3 is a view in elevation of the device of the invention shown in place or in engagement with the shank of a bit head.

Referring in detail to the drawing, the device of the invention comprises a body portion 2 having a hollow portion 4 in the form of a frustum of a cone, and having female threads 6 on the surface thereof adapted to engage corresponding threads 8 of the shank 10 of a bit head 12, as shown in Figure 3 of the drawing.

The body portion is provided with a laterally extending member 14 which is integral with the main body portion 2 of the tool in the preferred form of the device, as indicated in the drawing.

In the body portion 2, I preferably provide a slot or opening 16 extending from the top to the bottom of the main body portion and into the laterally extending part 14 so as to provide a space for the insertion of a chaser 18, the side walls of which space serve as guides for the chaser, which may be inserted into the slot from either the lower or upper surface of the laterally extending member 14.

At the forward end of the chaser is a cutting edge or threaded portion 20 adapted to cut or restore damaged threads on a part to be operated upon, or to clean the threads at the undamaged portions thereof.

Adjacent the opening 16 in the body portion 2 is an angular recess 22 extending through the body portion and opening outwardly into the hollow portion 4 so as to provide a space in which cuttings produced by the chaser 18 may fall in advance of the chaser during the thread restoring operation.

In order to hold the chaser 18 in place in the opening 16 in the laterally extending member 14, upper and lower plates 24 and 26 are preferably provided which serve as upper and lower guides in the forward and return movements of the chaser 18 and operate to accurately retain the threaded portion 20 of the chaser in alignment or registration with the threads 6 of the hollow portion 4, and also in proper engagement with the threads of the device or part operated upon. The plates 24 and 26 are preferably held in place by means of set screws 28, as indicated in the drawing.

Extending upwardly and downwardly from the upper and lower surface of the chaser 18 are dowels or pins 34 which engage in the slots 30 and 32 in the cover plates 24 and 26 and which serve to limit the forward and return movement of the chaser when in place in the opening 16.

In order to provide a uniformly distributed pressure in the engagement of the chaser with the threads of the part operated upon, I preferably provide spring members 36 and 38 which are mounted in slots 40 and 42, respectively, in the end portion 44 of the laterally extending member 14. The spring members are mounted so as to engage with the rear end portion 46 of the chaser 18 to exert pressure longitudinally of the chaser in a direction inwardly of the hollow portion 4 of the body portion and thereby provide a suitable pressure so that the cutting portion 20 of the chaser 18 cuts or restores only the damaged threads or cleans the threads of the part operated upon without cutting the undamaged portions of the threads.

In order to adjust the tension of the spring members 36 and 38 and to provide a predetermined pressure engagement of the cutting portion 20 of the chaser so as to permit restoring of the damaged portion of threads without producing a cut on the undamaged portions, I provide set screws 48 and 50 which may be adjusted to produce the desired tension.

In order to provide the necessary leverage action in the operation of the tool, a handle 52 is employed which is provided with male screw threads cooperating with female threads in an opening 54 located preferably at the central rear end portion of the extension member 14 in alignment with the slot 16 and chaser 18.

It will readily be seen that the tool described is capable of use for the purpose of cleaning and smoothing the threads of a tapered threaded connection. Thus, when the device is started on the small end of a tapered threaded connection, the springs 36 and 38 will urge the chaser 18 inwardly onto the threads even though at this point they will be of relatively small diameter. As the device is turned further onto the joint the chaser will be forced radially outwardly to accommodate the larger diameter threaded portion, the springs 36 and 38 in this instance being further compressed. The tool may thus be used to smooth the entire length of a tapered threaded member and will accommodate itself to the varying diameter of such member as it moves over the threads thereon.

While the tool illustrated has been shown as a tool suitable for cleaning male threads, it will readily be appreciated that the same principles would be incorporated in a corresponding tool for cleaning female threads. In such instance the threaded portion of the tool would of course be a male part and the chaser would be projected radially outwardly by the springs instead of radially inwardly.

It will be understood that the form of construction as above described is adapted to be readily disassembled, or taken apart, so as to occupy a minimum of space for shipment or storage and that the operating parts of the device are so located as to be protected in adjusted position, so that there is little danger of breakage, damage or displacement of the parts by carelessness or by rough handling of the tool.

While the device as described is particularly adapted to operate on external threads, it is obvious that by an obvious change in the form of construction, the same principle of operation may be applied for operation upon internal threads, as will be apparent to those skilled in the art.

It is to be understood that changes in the details of construction and modification or reversal of parts may be made in the device above described without departing from the spirit or scope of the invention as defined in the claims.

I claim:

1. A tool for restoring damaged threads upon the shank of bit heads and the like, which comprises a main body portion of substantially cylindrical form having a laterally extending portion integral therewith for holding a chaser, an opening in the said main body portion extending into said laterally extending portion, a chaser mounted in said opening, resilient means for adjustably engaging the said chaser to provide a predetermined inward pressure thereon and a removable handle connected to said laterally extending portion.

2. A tool for restoring damaged threads upon the shank of bit heads and the like, which comprises a bored main body portion of substantially cylindrical form having a laterally extending portion integral therewith for holding a chaser, said main body portion having internal threads in the bored portion to fit the external threads to be repaired, an opening extending through one side of the main body portion into said extending portion, a chaser mounted in said opening, resilient means in the said laterally extending portion for adjustably engaging the said chaser at the rear end thereof to provide a predetermined pressure inwardly on said chaser, and a demountable handle connected to said extending portion in substantially the plane of the said chaser.

3. A tool for restoring threads upon the shank of bit heads and the like, which comprises a tool body having an outwardly extending portion integral therewith, a hollow portion in said tool body having female threads on the surface thereof to fit the corresponding male threads on the shank of the bit head to be operated upon, an opening in said outwardly extending portion extending radially inwardly to said hollow portion, a chaser mounted in said opening and slidable radially therein, a threaded portion on the forward end of said chaser, the threads of which correspond substantially in pitch to that of said female threads, a recess in said hollow portion adjacent the cutting edge of the chaser to permit cuttings to drop therein in the operation of the tool, and resilient means for urging the said chaser inwardly during a thread restoring operation.

4. A tool for restoring damaged threads upon the shank of bit heads and the like, which comprises a cylindrical tool body having an outwardly extending portion of equal thickness integral therewith, a hollow portion in said tool body having female threads on the surface thereof to fit the corresponding male threads on the shank of the bit head to be operated upon, an opening extending through said outwardly extending portion and extending radially inwardly a distance at least the length of the chaser into said hollow portion, a chaser mounted in said opening and slidable radially therein, a threaded portion on the forward end of said chaser, the threads of which correspond in pitch to that of said female threads, a recess extending through said hollow portion adjacent the chaser to permit cuttings to drop therein ahead of the chaser in the operation of the tool, resilient means mounted in said outwardly extending portion for urging the said chaser forwardly during a thread restoring operation, and means for varying the amount of compression of said resilient means.

5. A tool for restoring threads which comprises a tool body having a central hollow threaded portion in the form of a frustum of a cone, said body having a laterally extending portion integral therewith, a slot extending through one side of said body and into said laterally extending portion to permit mounting of a chaser therein, an offset recess in said body adjacent said slot, a chaser having a threaded portion upon the inner surface thereof, means for mounting said chaser in said slot to retain said chaser therein, and spring means mounted in said laterally extending portion to urge said chaser inwardly.

6. A tool for restoring damaged threads which comprises a main body portion of substantially cylindrical form and a laterally extending portion integral therewith, said main body portion having a central hollow threaded portion in the form of a frustum of a cone, a slot extending transversely through one side of said body and into said laterally extending portion to permit mounting of a chaser therein, an offset recess in said body adjacent said slot, a chaser having a threaded portion corresponding in pitch to that of said hollow threaded portion, means for mounting said chaser in said slot to retain said chaser therein comprising adjacent side walls and upper and lower removable plates, spring means mounted in said laterally extending portion to urge said chaser inwardly, and means for varying the tension of said spring means.

7. A tool for restoring threads upon the shank of bit heads and the like, which comprises a central hollow threaded portion in the form of a frustum of a cone, a laterally extending part integral with said body portion adapted for the mounting of a chaser therein, a slot extending through one side of said central hollow threaded portion and into said laterally extending portion, a cover member on said laterally extending portion for holding said chaser laterally in place, a chaser mounted in said slot, spring means in said laterally extending portion mounted so as to engage the rear surface of said chaser, means for adjustably varying the tension of said spring means to provide a predetermined inward pressure on the chaser during a thread restoring operation and a handle adapted to engage said laterally extending portion.

8. A tool for restoring threads upon the shank of bit heads and the like, which comprises a body portion, a central hollow threaded portion in the form of a frustum of a cone therein, a laterally extending member integral with said body portion for mounting a chaser therein, a slot extending through one side of said hollow threaded portion into said laterally extending member so as to provide openings from both the top and bottom of said laterally extending member, a cover plate on said top and bottom adapted to prevent upward and downward movement of the chaser when positioned in said slot, a recess extending through said body portion to one side of said slot to permit cuttings produced by the chaser to drop therein during the thread restoring operation, spring means mounted in said laterally extending member so as to engage the rear end of the chaser at the upper and lower portion thereof to provide uniformly distributed pressure engagement of the chaser with the threads operated upon and means for adjusting the tension of the spring means without disengaging the tool from the threads operated upon.

9. A tool for restoring threads upon the shank of bit heads and the like, which comprises a substantially cylindrical body having a central hollow threaded portion in the form of a frustum of a cone, a laterally extending part integral with said body portion having substantially the same thickness as the said body portion and adapted for the mounting of a chaser therein, a slot extending through one side of said central hollow threaded portion and into said laterally extending portion, a chaser mounted in said slot, a cover member on said laterally extending portion, a pin and slot connection between said chaser and said cover member for limiting the longitudinal movement of the chaser, spring means in said laterally extending portion mounted so as to engage the rear surface of said chaser, and means for adjustably varying the tension of said spring means to provide a predetermined inward pressure on the chaser during a thread restoring operation.

10. A tool for restoring threads upon the shank of bit heads and the like, which comprises a body portion, a central hollow threaded portion in the form of a frustum of a cone therein, a laterally extending member integral with said body portion for mounting a chaser therein, an opening extending through one side of said hollow threaded portion into said laterally extending member so as to leave an open space from the top to the bottom of said laterally extending member, a cover plate on each side of said open space serving as guides to prevent upward and downward movement of the chaser in said opening, a slot in each of said cover plates, a pin on each side of said chaser riding in each of said slots to limit the movement of the chaser in a forward and return direction in said opening, a recess extending through said body portion to one side of said opening to permit cuttings produced by the chaser to drop therein during the thread restoring operation, spring means mounted in said laterally extending member so as to engage the rear end of the chaser at the upper and lower portions thereof to provide uniformly distributed pressure engagement of the chaser with the threads operated upon and screw means in said laterally extending member and accessible from the rear thereof for adjusting the tension of the spring means without disengaging the tool from the threads operated upon.

11. A tool for restoring damaged threads which comprises a main body portion having a threaded part adapted to receive and engage the damaged threads, a chaser carried by said body portion and adapted to engage the damaged threads when they are received and engaged by said part, and means for resiliently urging said chaser against said damaged threads so that it may yield to accommodate varying diameters of the damaged threads.

12. A tool for restoring damaged threads which comprises a main body portion having a tapered threaded part adapted to receive and engage the damaged threads, a chaser carried by said body portion and movable to engage threads received and engaged by said threaded part of the body, and means for resiliently urging said chaser toward such damaged threads.

JESSE F. BROWN.